United States Patent
Kuroki et al.

(10) Patent No.: US 8,989,203 B2
(45) Date of Patent: Mar. 24, 2015

(54) ELECTRONIC DEVICE, COMMUNICATION CONTROL METHOD, AND RECORDING MEDIUM

(71) Applicant: Canon Kabushiki Kaisha, Tokyo (JP)

(72) Inventors: Kenji Kuroki, Toride (JP); Keita Takahashi, Abiko (JP); Kuniyasu Kimura, Toride (JP); Satoru Yamamoto, Noda (JP); Takuya Hayakawa, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 13/767,455

(22) Filed: Feb. 14, 2013

(65) Prior Publication Data

US 2013/0223455 A1 Aug. 29, 2013

(30) Foreign Application Priority Data

Feb. 23, 2012 (JP) .................. 2012-037261

(51) Int. Cl.
*H04L 12/54* (2013.01)
*H04L 12/28* (2006.01)
*H04L 12/911* (2013.01)
*H04L 12/861* (2013.01)

(52) U.S. Cl.
CPC ............ *H04L 47/82* (2013.01); *H04L 49/9005* (2013.01)
USPC ........................................ 370/429; 370/235

(58) Field of Classification Search
USPC ........................ 370/235, 389, 392, 428, 429
See application file for complete search history.

(56) References Cited

U.S. PATENT DOCUMENTS

| | | | | |
|---|---|---|---|---|
| 6,349,389 | B1 | 2/2002 | Sekiya et al. | 713/600 |
| 6,697,859 | B1 | 2/2004 | Takahashi | 709/225 |
| 6,834,321 | B2 | 12/2004 | Yokoyama | 710/316 |
| 7,382,788 | B2* | 6/2008 | Furey et al. | 370/401 |
| 7,826,470 | B1* | 11/2010 | Aloni et al. | 370/419 |
| 8,630,199 | B2* | 1/2014 | Nordmark et al. | 370/252 |
| 8,811,422 | B2* | 8/2014 | Georgiou et al. | 370/466 |
| 2004/0073703 | A1* | 4/2004 | Boucher et al. | 709/245 |
| 2005/0165985 | A1* | 7/2005 | Vangal et al. | 710/107 |
| 2007/0079045 | A1* | 4/2007 | Luke | 710/313 |
| 2011/0022743 | A1* | 1/2011 | Liu | 710/36 |
| 2011/0099308 | A1* | 4/2011 | Garney et al. | 710/100 |
| 2011/0173396 | A1* | 7/2011 | Sugumar et al. | 711/137 |

* cited by examiner

*Primary Examiner* — Redentor Pasia
(74) *Attorney, Agent, or Firm* — Fitzpatrick, Cella, Harper & Scinto (57) ABSTRACT

Provided is an electronic device capable of performing stable communications between a plurality of electronic devices connected in series. A communication device (121) is inserted and connected to a serial communication channel between a host controller (101) and a communication device (141) at a subsequent stage, and includes a buffer (124) for temporarily accumulating a first data received from the communication device (141) at the subsequent stage. The communication device (121) monitors a communication situation with respect to the host controller (101) and the communication device (141), accumulates the first data in the buffer (124) when a second data to be transmitted from the communication device (121) to the host controller (101) is being transmitted to the host controller (101), and transmits the first data accumulated in the buffer (124) to the host controller (101) in response to the finish of transmission of the second data.

11 Claims, 8 Drawing Sheets

| DESTINATION ID | TRANSMISSION DESTINATION, TRANSMISSION SOURCE |
|---|---|
| 00h | HOST CONTROLLER |
| 01h | PREVIOUS-STAGE COMMUNICATION DEVICE |
| 02h | SUBSEQUENT-STAGE COMMUNICATION DEVICE |

FIG. 4

| COMMAND ID | CONTENTS OF COMMAND | DIRECTION |
|---|---|---|
| 00h | INITIALIZATION REQUEST | HOST -> DEVICE |
| 10h | PORT INFORMATION ACQUISITION REQUEST | HOST -> DEVICE |
| 80h | REQUEST SUCCESS RESPONSE | DEVICE -> HOST |
| 90h | PORT INFORMATION CHANGE NOTIFICATION | DEVICE -> HOST |
| A0h | ACTIVATION NOTIFICATION | DEVICE -> HOST |
| A8h | CONNECTION ESTABLISHMENT NOTIFICATION | DEVICE -> HOST |

ELECTRONIC DEVICE, COMMUNICATION CONTROL METHOD, AND RECORDING MEDIUM

BACKGROUND OF THE INVENTION

1. Field of the Invention

The present invention relates to an electronic device including a plurality of microprocessors or integrated circuits (ICs) or an electronic apparatus equipped therewith. In particular, the present invention relates to an electronic device for transmitting/receiving data by serial communications to/from another electronic device connected thereto in series.

2. Description of the Related Art

Some communication systems are configured by connecting a plurality of electronic devices that can transmit/receive data by serial communications in series to an electronic device being a host controller. In such communication systems, for example, a plurality of electronic devices being communication counterparts are connected to a serial communication signal line of one communication channel, and communications are performed while switching the electronic devices being the communication counterparts. In order to select the communication counterpart, a chip select signal line (CS signal line) may be provided separately from the serial communication signal line, but in this case, the signal line increases in number, and the configuration of the communication system becomes complicated. Therefore, packet communications, which use a packet obtained by adding identification information for identifying the communication counterpart to data, are effective.

In the packet communications, for example, in the communication system in which two electronic devices are connected in series to the host controller, when the host computer transmits a packet to the electronic device located at a subsequent stage, the electronic device located at a previous stage relays the packet from the host computer to the electronic device located at a subsequent stage. Therefore, it is possible to build the communication system that suppresses the number of signal lines and a signal wire length to a minimum.

U.S. Pat. No. 6,349,389 discloses a communication system configured by a relay substation for receiving a serial communication signal which is connected to a host controller and another relay substation further connected in series to the relay substation. In this system, the host controller can communicate with each of the relay substations in a transparent manner.

U.S. Pat. No. 6,834,321 discloses a control system in which a plurality of electronic devices are connected in series to a host controller. When receiving a packet that is not addressed to itself, each of the electronic devices switches an input signal and relays the packet to another electronic device connected to the subsequent stage.

The communication system in which the plurality of electronic devices are thus connected in series to the host controller can be configured with a small number of signal lines and a short signal line length. With such a configuration, if a communication format in which each of the electronic devices returns a response to a request received from the host controller is used, the host controller can adjust a transmission timing of data received from each of the electronic devices, and hence a collision of data does not occur. However, in a case where the electronic device other than the host controller is allowed to spontaneously transmit data, there is a fear that the respective electronic devices may experience an overlap in the transmission timing, thereby causing a collision of data, and that a stable environment cannot be provided.

Therefore, there is a method of preventing the collision of data by time-division communications defining in advance a timing at which each of the electronic devices starts spontaneous communications. However, use of such time-division communications raises a problem that an effective communication rate becomes lower.

SUMMARY OF THE INVENTION

In order to solve the above-mentioned problem, according to an exemplary embodiment of the present invention, there is provided an electronic device, including: a first interface configured to communicate with a first communication device located on an upstream side of a communication path; a second interface configured to communicate with a second communication device located on a downstream side of the communication path; a buffer configured to accumulate the data which is received from the second communication device via the second interface; a generating unit configured to generate data to be transmitted to the first communication device; a determination unit configured to determine whether or not transmission to the first communication device is being performed via the first interface when reception from the second communication device is performed via the second interface; and a control unit configured to when the determination unit determines that the transmission to the first communication device is being performed via the first interface, accumulate data received from the second communication device in the buffer, and transmit the received data accumulated in the buffer to the first communication device after the transmission to the first communication device is finished, and when the determination unit determines that the transmission to the first communication device is not being performed via the first interface, transmit the data received from the second communication device to the first communication device without accumulating the received data received in the buffer.

Further features of the present invention will become apparent from the following description of exemplary embodiments (with reference to the attached drawings).

DESCRIPTION OF THE EMBODIMENTS

In the following, an embodiment of the present invention is described in detail with reference to the accompanying drawings.

(Overall Configuration)

Figure 1:
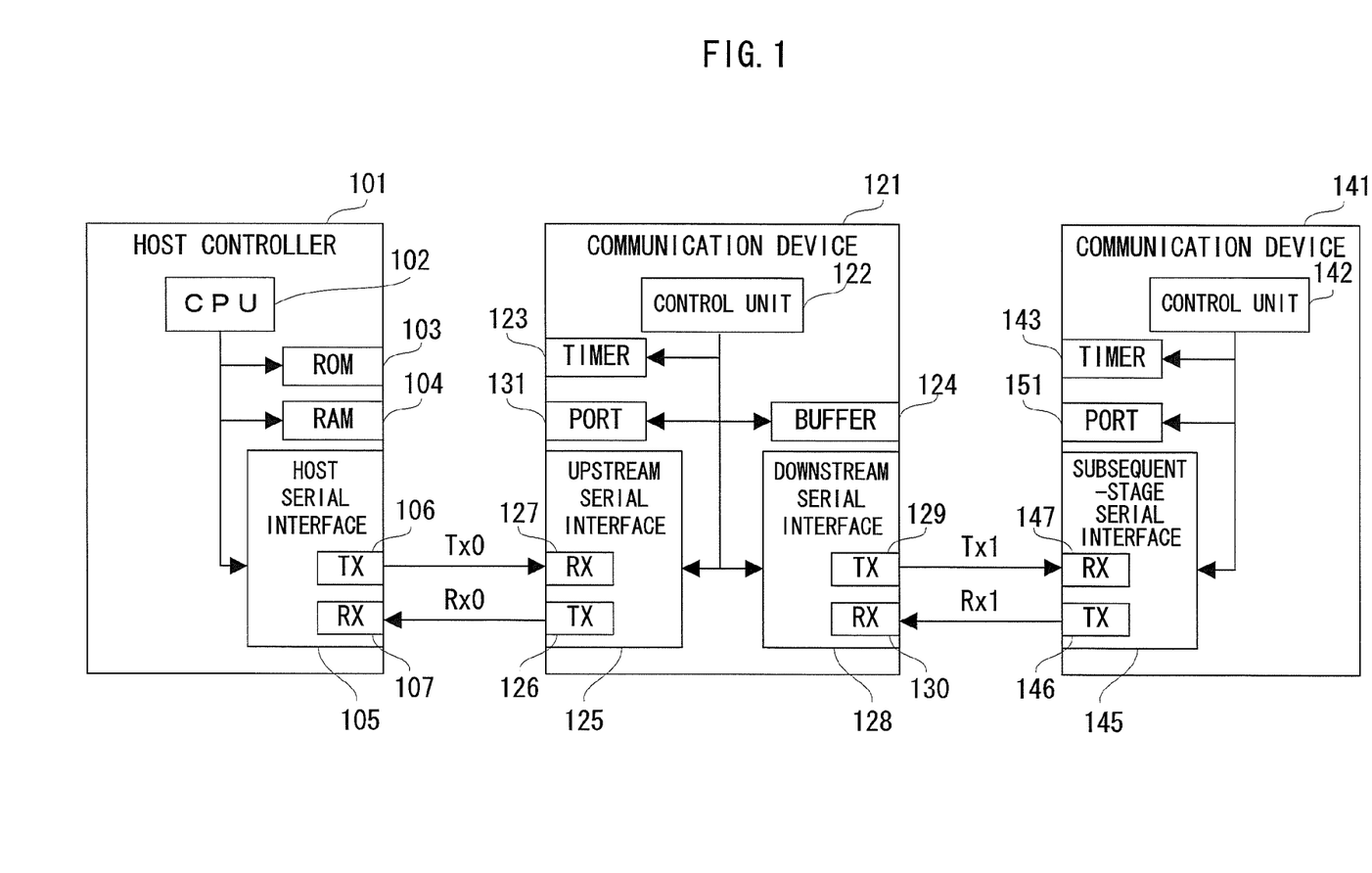
FIG. 1 is a block diagram of a system according to an embodiment of the present invention.

FIG. 1 is a block diagram of a system configured by using a communication device exemplifying an electronic device according to this embodiment, in which data is transmitted/received through a serial communication path.

This system includes a host controller 101 for monitoring the state of each communication devices 121 and 141. The host controller 101 issues various instructions to each of the communication devices 121 and 141. The host controller 101 is connected directly to the communication device 121 at a previous stage (hereinafter referred to also as "previous-stage communication device 121") for transmitting/receiving data by serial communications. The communication device 121 is connected to the communication device 141 at a subsequent stage (hereinafter referred to also as "subsequent-stage communication device 141") for transmitting/receiving data to/from the host controller 101 via the communication device 121. Note that, the host controller 101 also exemplifies the electronic device. A packet is used as the data transmitted/received between the host controller 101 and the communication devices 121 and 141.

The host controller 101 includes a central processing unit (CPU) 102 for controlling an overall operation thereof. The CPU 102 reads commands from a read only memory (ROM) 103, successively executes the commands, and saves execution results thereof to a random access memory (RAM) 104. Further, the host controller 101 is allowed to perform the serial communications with the communication device 121 by a host serial interface 105.

The host serial interface 105 is a full-duplex start-stop synchronization serial interface. The host serial interface 105 transmits transmission data written by the CPU 102 from a transmission port 106 bit by bit through an internal shift register. A start bit, a parity bit, and a stop bit are added before and after a transmission bit string.

In a case where data is received from the communication device 121, the received data is sampled bit by bit by a reception port 107. Further, the CPU 102 is notified that the received data of one byte has been received through the internal shift register. By reading the data received by the host serial interface 105, the CPU 102 can acquire the data from the communication device 121. The CPU 102 saves the read data to the RAM 104.

The previous-stage communication device 121 includes a control unit 122, a timer 123, an upstream serial interface 125, a downstream serial interface 128, a buffer 124, and a port 131. The previous-stage communication device 121 may include those components in a hardware manner, or may be realized by executing a computer program according to the present invention by a general-purpose computer including a CPU, a RAM, a ROM, and an input/output interface.

The upstream serial interface 125 includes an upstream transmission port 126 and an upstream reception port 127, and transmits/receives data to/from the host controller 101. The upstream serial interface 125 is a full-duplex start-stop synchronization serial interface in the same manner as the host serial interface 105 of the host controller 101.

The downstream serial interface 128 is connected to the subsequent-stage communication device 141 by a two-wire serial signal line, and performs full-duplex serial communications with the communication device 141.

The downstream serial interface 128 includes a downstream transmission port 129 and a downstream reception port 130. Data is transmitted to the communication device 141 by the downstream transmission port 129. Data is received from the communication device 141 by the downstream reception port 130.

The port 131 is an I/O port capable of acquiring an output of a logic to the upstream transmission port 126 and the downstream transmission port 129 and a voltage state in a binary manner.

The timer 123 issues a transmission request to the control unit 122 at predetermined time intervals, for example, every 2 milliseconds.

The control unit 122 monitors communication situations of the upstream serial interface 125 and the downstream serial interface 128. The control unit 122 generates data to be transmitted to the host controller 101. Therefore, the generated data includes information for designating the host controller 101 as a transmission destination. The control unit 122 transmits the generated data to the host controller 101 via the upstream serial interface 125 in response to the transmission request received from the timer 123. Then, the control unit 122 decodes the data received by the downstream serial interface 128, and performs processing such as returning of data on the port 131 and outputting of a desired logic to the port 131.

The buffer 124 is a line buffer in which the data received by the downstream serial interface 128 is temporarily accumulated. The received data is accumulated in the buffer 124 if the upstream serial interface 125 is transmitting data to the host controller 101 when the downstream serial interface 128 receives data addressed to the host controller 101 from the communication device 141. If the upstream serial interface 125 is not transmitting data thereto, the data is sent from the downstream serial interface 128 to the upstream serial interface 125 as it is without using the buffer 124. Further, the buffer 124 is not used to accumulate the data received by the upstream serial interface 125.

The subsequent-stage communication device 141 is connected to the previous-stage communication device 121 by the two-wire serial signal line. The communication device 141 includes a control unit 142, a timer 143, a port 151, and a subsequent-stage serial interface 145.

The port 151 is an I/O port capable of acquiring an output of a logic to a transmission port 146 of the subsequent-stage serial interface 145 and a voltage state in a binary manner. The timer 143 issues a transmission request to the control unit 142 at predetermined time intervals, for example, every 2 milliseconds. The control unit 142 operates in accordance with the data transmitted from the host controller 101.

The control unit 142 generates data to be transmitted to the host controller 101. Therefore, the generated data includes information for designating the host controller 101 as the transmission destination. The control unit 142 transmits the generated data to, for example, the host controller 101 via the subsequent-stage serial interface 145 in response to the transmission request received from the timer 143. Further, the control unit 142 decodes the data received by the subsequent-stage serial interface 145, and performs processing such as returning of data on the port 151 and outputting of a desired logic to the port 151.

The subsequent-stage serial interface 145 includes the transmission port 146 and a reception port 147, and can transmit/receive data to/from the communication device 121. The subsequent-stage serial interface 145 is a full-duplex start-stop synchronization serial interface in the same manner as the host serial interface 105 of the host controller 101.

Figure 2:
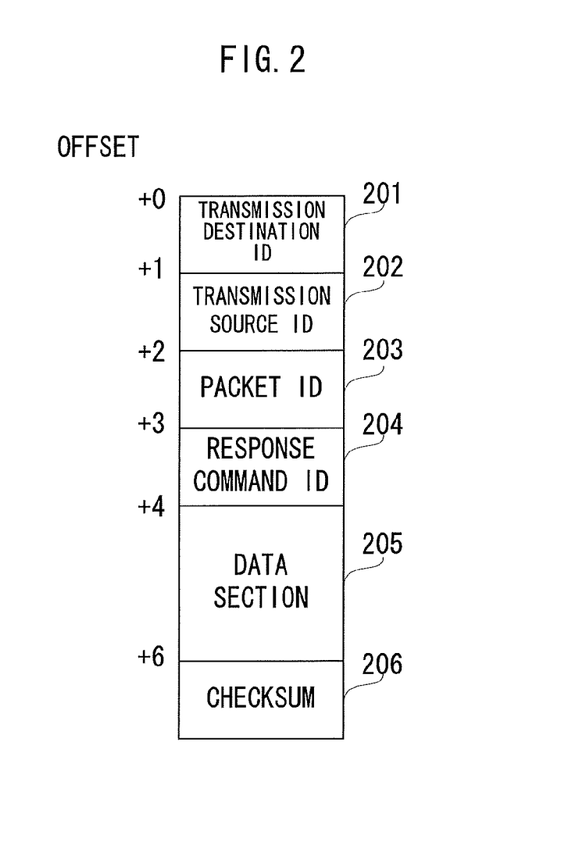
FIG. 2 is a diagram exemplifying a data structure of a packet.

FIG. 2 is a diagram exemplifying a structure of the packet being the data transmitted/received between the host controller 101 and the communication device 121 or the communication device 141.

Figure 3:
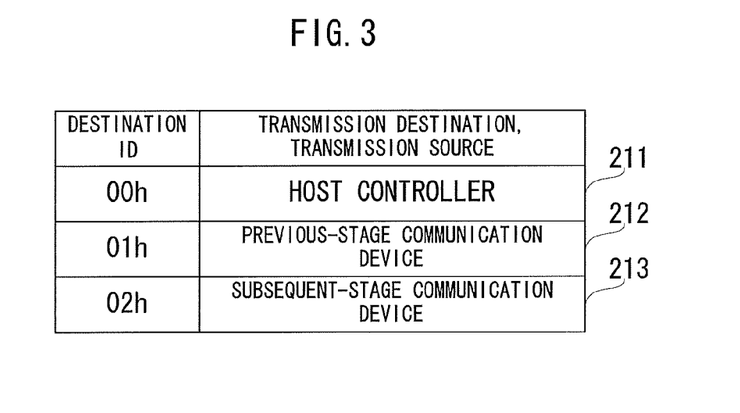
FIG. 3 is a diagram exemplifying a transmission destination ID.

The packet includes in a head thereof a transmission destination ID 201 being a value indicating the destination of the packet. FIG. 3 is a diagram exemplifying a transmission destination ID. In this example, "00h", "01h", and "02h" are set as the transmission destination ID 201 in cases where the packet is addressed to the host controller 101, the communication device 121, and the communication device 141, respectively. The transmission destination ID 201 is followed by a transmission source ID 202. The transmission source ID 202 is a value indicating a transmission source of the packet. The value of the same type as the transmission destination ID 201 is used for the transmission source ID 202.

The packet includes a packet ID 203 following the transmission source ID 202. The packet ID 203 is a sequence number assigned to the packet transmitted by each of the host controller 101 and the communication devices 121 and 141. Each time one packet is transmitted from the host controller 101 and the communication devices 121 and 141, the packet ID 203 is incremented by one.

On a receiving end, a packet loss can be detected based on the packet ID 203.

Figure 4:
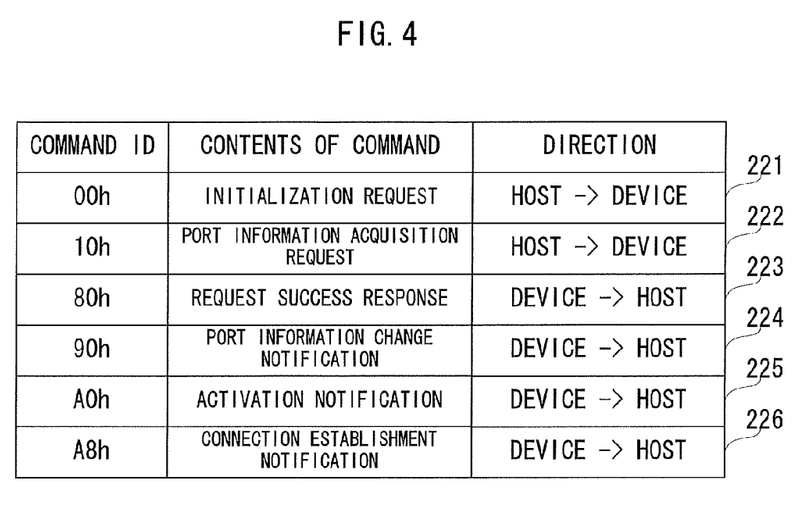
FIG. 4 is a diagram exemplifying a response command ID.

The packet includes a response command ID 204 following the packet ID 203. The response command ID 204 indicates contents of an instruction between the host controller 101 and the communication device 121 or the communication device 141. FIG. 4 exemplifies the contents of the response command ID 204. For example, in a case where the communication device 121 or the communication device 141 notifies the host controller 101 of a change in port information, the response command ID 204 becomes "90h" indicating a port information change notification 224. In a case where the host controller 101 requests the communication device 121 or the communication device 141 to acquire information, the response command ID 204 becomes "10h" indicating a port information acquisition request 222.

The packet includes a data section 205 following the response command ID 204. The data section 205 includes, for example, 16-bit port binary detection information in a case where the communication device 121 or the communication device 141 notifies the host controller 101 of the change in the port information.

The packet includes a checksum 206 following the data section 205. The checksum 206 is a value used for packet error detection.

In general, in a case of performing a cascade connection formed of a plurality of stages such as the communication device 121 and the communication device 141, it is necessary to prevent a conflict in timing of the packets transmitted from the communication devices 121 and 141 to the host controller 101. Therefore, the host controller 101 sends to the communication device of the communication counterpart the packet with the communication device of the communication counterpart specified as the transmission destination ID 201 and the port information acquisition request 222 set as the response command ID 204. The communication device being the communication counterpart often returns the packet in response thereto.

In this embodiment, the communication device 121 and the communication device 141 are allowed to transmit a packet at an arbitrary timing by the timers 123 and 143 incorporated therein, respectively, as described above. This enhances the detection responsiveness of the host controller 101 with respect to a change in the states of the communication devices 121 and 141.

(Processing Performed by Host Controller 101)

Figure 5:
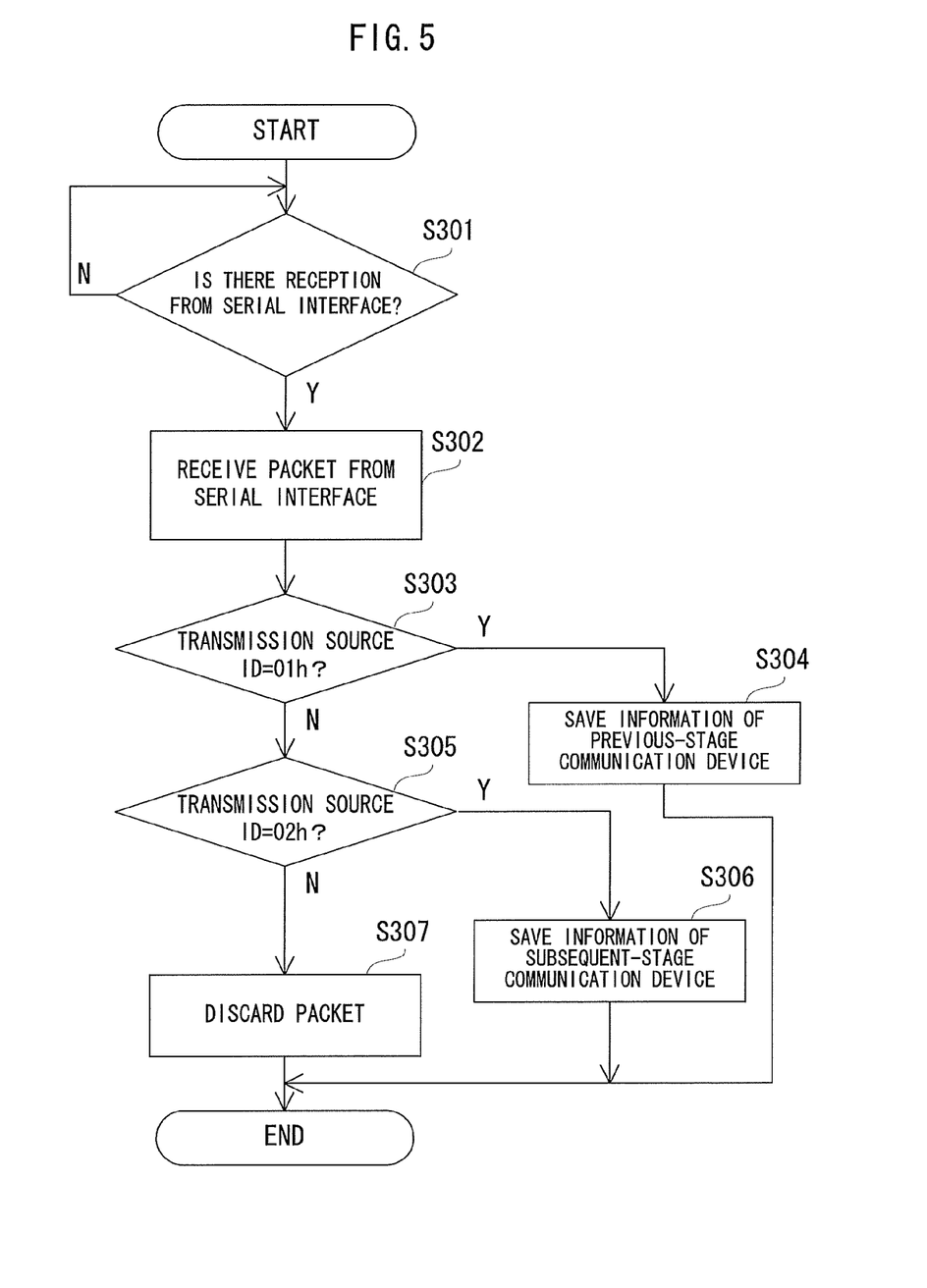
FIG. 5 is a flowchart of reception processing performed by a host controller.

A control flow of processing for receiving the packet from the communication device 121 or the communication device 141 which is performed by the host controller 101 is described with reference to FIG. 5. In the following description, "S" denotes a processing step.

After starting reception processing, the CPU 102 of the host controller 101 verifies whether or not reception from the host serial interface 105 has been detected (S301). The reception is repeatedly waited for until the reception is detected (S301: N), and if the reception is detected, the packet is received by the host serial interface 105 (S301: Y and S302).

The CPU 102 examines which of the previous-stage communication device 121 and the subsequent-stage communication device 141 the packet has been received from based on the transmission source ID 202 of the received packet. Specifically, it is examined which of "01h" and "02h" the transmission source ID 202 is.

If the transmission source ID 202 is "01h", it is determined that the received packet is the data, for example, the port information, received from the previous-stage communication device 121, and contents of the data section 205 of the received packet are saved to the RAM 104 (S303: Y and S304). If the transmission source ID 202 is "02h", it is determined that the received packet is the data, for example, the port information, received from the subsequent-stage communication device 141, and contents of the data section 205 of the received packet are saved to the RAM 104 (S303: N, S305: Y, and S306). The CPU 102 saves the packets to the RAM 104 separately on a transmission source basis.

If the transmission source ID 202 is neither "01h" nor "02h", the CPU 102 determines that the received packet is illegal data and discards the received packet (S303: N, S305: N, and S307). After this step, a series of processing performed by the host controller 101 regarding the reception of the packet is brought to an end. After the series of processing is finished, the procedure returns to the processing of Step S301.

(Processing Performed by Previous-Stage Communication Device 121)

Figure 6:
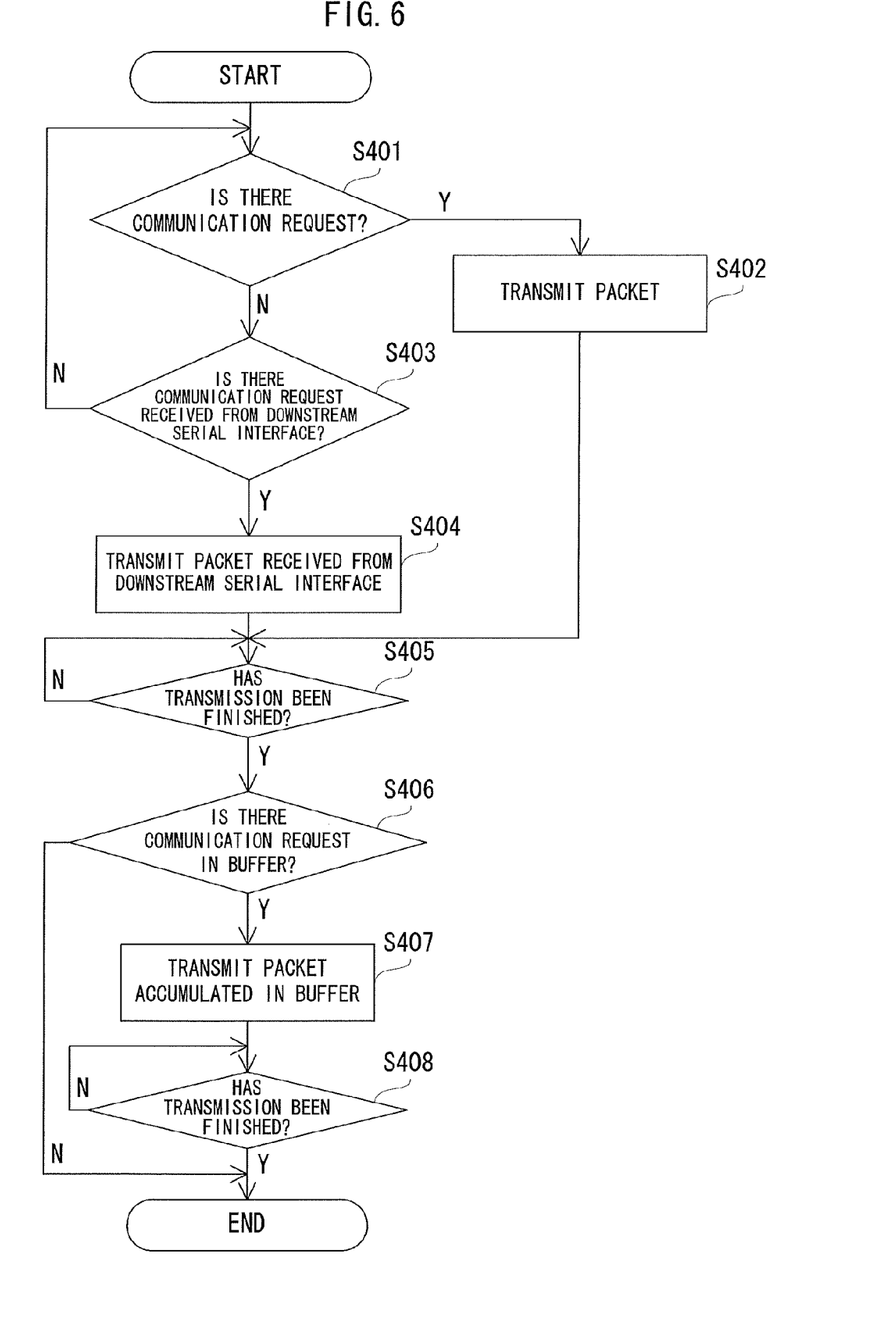
FIG. 6 is a flowchart of transmission processing performed from a communication device at a previous stage to the host controller.

A control flow of processing for transmitting data to the host controller 101 which is performed by the previous-stage communication device 121 is described with reference to FIG. 6.

The control unit 122 of the communication device 121 monitors the communication situation with respect to the host controller 101, and when becoming ready to perform the transmission, verifies whether or not there is a communication request within the communication device 121 (S401). If there is a communication request within the communication device 121 such as the transmission request issued by the timer 123, the control unit 122 generates a packet corresponding to the communication request within the communication device 121, and transmits the packet to the host controller 101 via the upstream serial interface 125 (S401: Y and S402).

If there is no communication request within the communication device 121, the control unit 122 verifies whether or not there is a communication request received from the subsequent-stage communication device 141 (S401: N and S403).

If there is a communication request received from the downstream serial interface 128, the control unit 122 relays the received packet from the downstream serial interface 128 to the host controller 101 via the upstream serial interface 125 (S403: Y and S404).

If there is no communication request received from the downstream serial interface 128, the control unit 122 returns to a state for verifying whether or not there is a communication request within the communication device 121 (S403: N and S401).

If the transmission of the packet within the communication device 121 or the relay and transmission of the packet from the communication device 141 is finished (S405: Y), the control unit 122 verifies whether or not a packet is accumulated in the buffer 124 (S406). If a packet is accumulated in the buffer 124, the control unit 122 transmits the packet accumulated in the buffer 124 to the host controller 101 via the upstream serial interface 125 (S406: Y and S407). When the transmission of the packet is finished (S408: Y), or if there is no packet accumulated in the buffer 124 (S406: N), a series of transmission processing performed from the communication device 121 to the host controller 101 is brought to an end. After the series of processing is finished, the control unit 122 returns to the processing of Step S401.

If the communication requests are simultaneously issued from the previous-stage communication device 121 and from the subsequent-stage communication device 141 in the processing of Steps S401, S402, S406, and S407, the control unit 122 preferentially performs the communication request of the communication device 121. Therefore, no collision occurs between the packets from the communication devices 121 and 141. Then, the packet based on the communication request of the previous-stage communication device 121 and the packet based on the communication request of the subsequent-stage communication device 141 are transmitted from the upstream serial interface 125 of the previous-stage communication device 121 alternately to the host controller 101.

A control flow of processing for receiving and relaying the packet from the subsequent-stage communication device 141 which is performed by the previous-stage communication device 121 is described with reference to FIG. 7.

The control unit 122 of the communication device 121 monitors the communication situation with respect to the subsequent-stage communication device 141, and verifies whether or not reception from the downstream serial interface 128 has been detected (S501). The reception is repeatedly waited for if there is no reception (S501: N). If the reception is detected, the control unit 122 receives the packet from the subsequent-stage communication device 141 through the downstream serial interface 128 (S501: Y and S502).

If the reception of the packet is finished, the control unit 122 of the communication device 121 examines the transmission destination ID 201 of the received packet. If the transmission destination ID 201 is "00h" indicating the packet addressed to the host controller 101, the control unit 122 performs relay processing for the packet (S503: Y). If the transmission destination ID 201 is not "00h", the control unit 122 determines that the packet is addressed to an illegal destination and discards the packet (S503: N and S504).

In the relay processing for the packet, the control unit 122 first verifies whether or not the upstream serial interface 125 is currently transmitting the packet (S505). If the upstream serial interface 125 is currently transmitting a packet, the control unit 122 accumulates the received packet in the buffer 124 (S505: Y and S506). If a packet is accumulated in the buffer 124, the control unit 122 transmits the packet accumulated in the buffer 124 after the transmission of the packet currently being transmitted has been completed as described in the processing of Step S406 and the subsequent steps of FIG. 6.

If the upstream serial interface 125 is not currently transmitting the packet, the control unit 122 issues the transmission request for the packet to the upstream serial interface 125 (S505: N and S507). After that, the packet is transmitted (S508). When the transmission of the packet is finished (S508: Y), or when the transmission of the packet accumulated in the buffer 124 is finished, a series of processing for relaying the packet from the communication device 141 to the host controller 101 is brought to an end. After the series of processing is finished, the procedure returns to the processing of Step S501.

In the processing of Step S505, it is determined whether to accumulate the packet in the buffer 124 or to directly perform cut-through forwarding in accordance with a use status of the upstream serial interface 125 used for relay transmission. Therefore, it is possible to realize higher-speed communications than the forwarding through the intermediation of the buffer such as a store and forward method.

(Processing Performed by Subsequent-Stage Communication Device 141)

Figure 8:
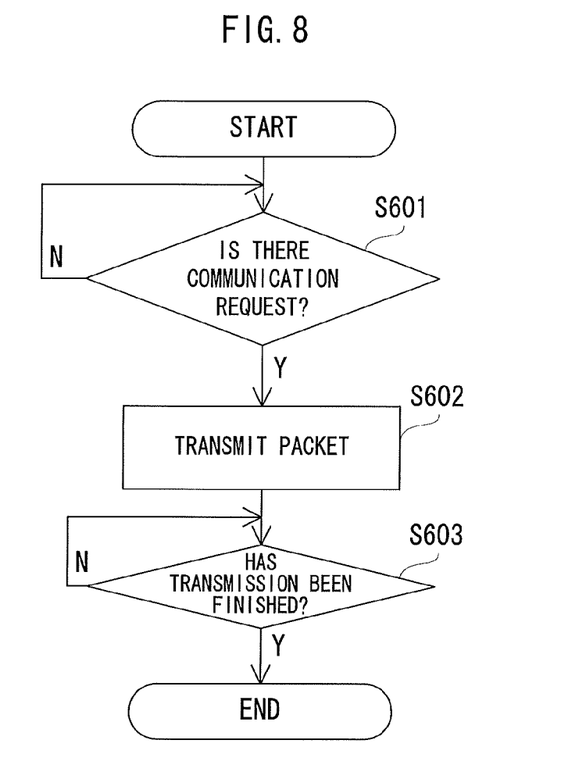
FIG. 8 is a flowchart of transmission processing performed from the communication device at the subsequent stage to the host controller.

A control flow of processing for transmitting data to the host controller 101 which is performed by the subsequent-stage communication device 141 is described with reference to FIG. 8. The subsequent-stage communication device 141 is directly connected to the previous-stage communication device 121. Therefore, the communication device 141 transmits the packet addressed to the host controller 101 to the previous-stage communication device 121. In this case, the transmission destination ID 201 is "00h" indicating the host controller 101 as illustrated in FIG. 3.

The control unit 142 of the subsequent-stage communication device 141 verifies whether or not there is a communication request within the communication device 141 such as the transmission request issued by the timer 143. If there is a communication request within the communication device 141 (S601: Y), the control unit 142 generates a packet formed of the communication request within the communication device 141, and transmits the packet from the subsequent-stage serial interface 145 (S602). When the transmission of the packet is finished, a series of processing for transmitting the packet from the communication device 141 to the host controller 101 is brought to an end (S603: Y). After the series of processing is finished, the procedure returns to the processing of Step S601.

(Timing Chart)

Figure 9:
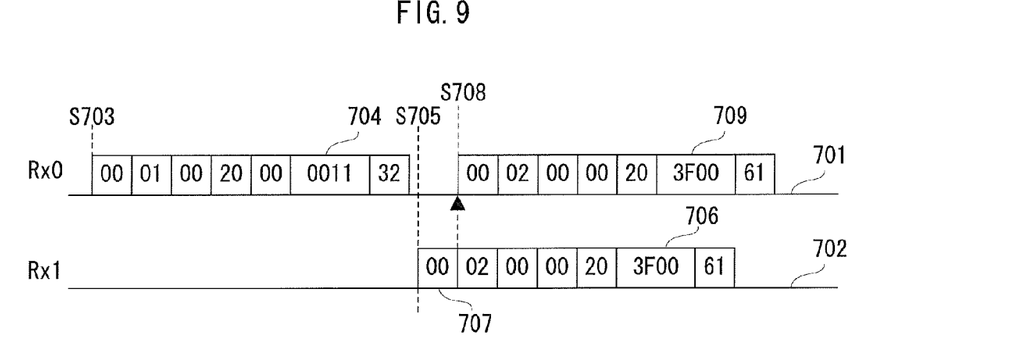
FIG. 9 is an explanatory diagram of a transmission timing of the packet.
Figure 10:
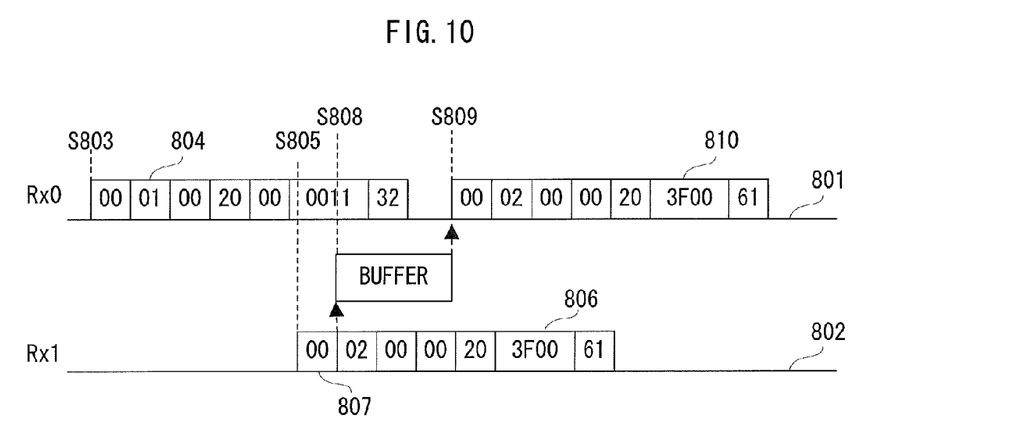
FIG. 10 is an explanatory diagram of the transmission timing of the packet.

Referring to FIG. 9 and FIG. 10, a transmission timing of the packet within the respective control flows of FIG. 5 to FIG. 8 is described.

FIG. 9 is an explanatory diagram of a control timing in a case where the packet is transmitted from the subsequent-stage communication device 141 after the packet is transmitted from the previous-stage communication device 121.

A serial signal line 701 connects the previous-stage communication device 121 to the host controller 101. Through the serial signal line 701, the packet is transmitted from the upstream transmission port 126 of the communication device 121 and received by the reception port 107 of the host controller 101.

A serial signal line 702 connects the subsequent-stage communication device 141 to the previous-stage communication device 121. Through the serial signal line 702, the packet is transmitted from the transmission port 146 of the communication device 141 and received by the downstream reception port 130 of the communication device 121.

At a timing S703, a packet 704 is transmitted from the previous-stage communication device 121 to the host controller 101. At a timing S705 after the transmission of the packet 704 is finished, a packet 706 is transmitted from the subsequent-stage communication device 141 to the previous-stage communication device 121.

Figure 7:
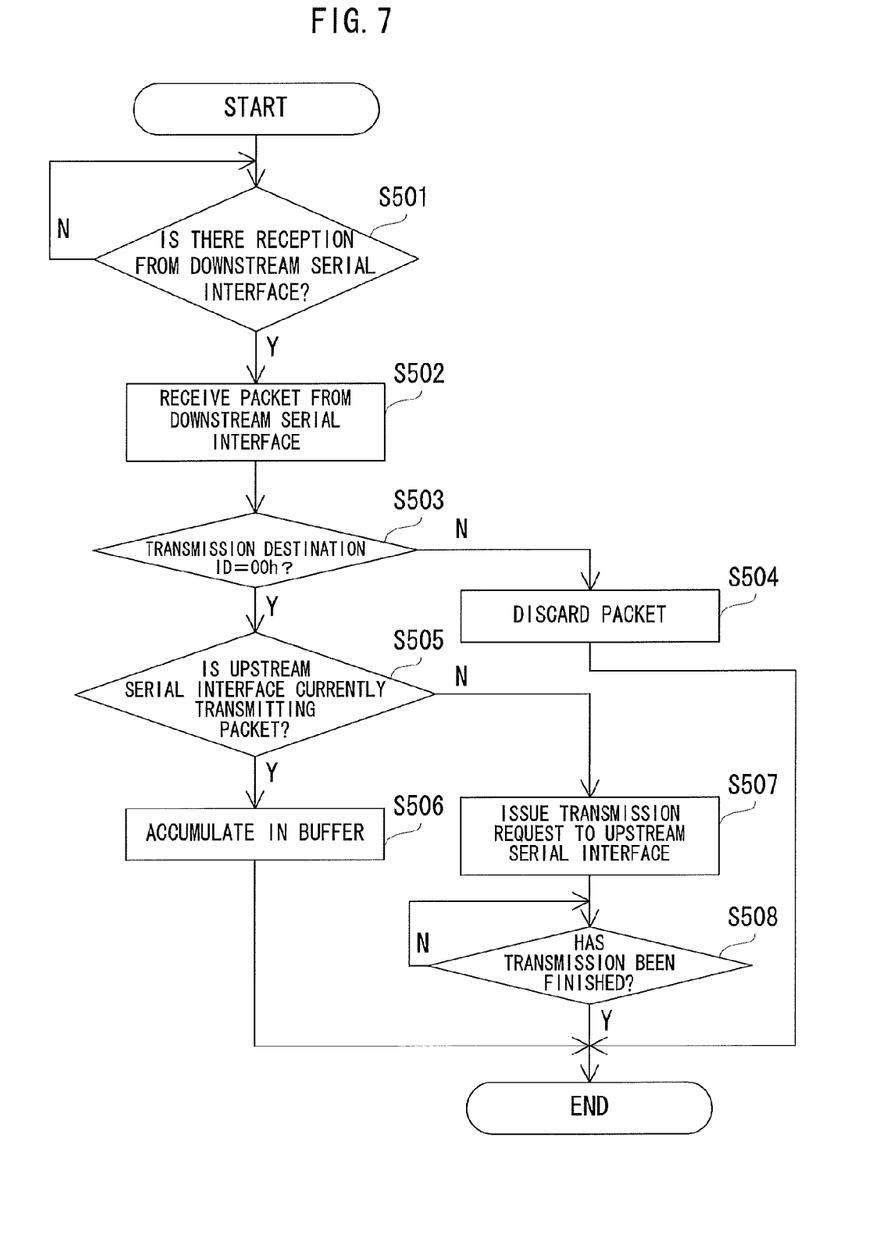
FIG. 7 is a flowchart of processing for receiving data from a communication device at a subsequent stage performed by the communication device at the previous stage.

The previous-stage communication device 121 that has received the packet 706 confirms that the transmission destination ID 201 of the packet 706 is "00h" indicating the packet addressed to the host controller 101 in accordance with Step S503 of FIG. 7. The transmission destination ID 201 is included in data 707 stored in an offset address +0 of the packet 706. After confirming that the transmission destination ID 201 is "00h", the communication device 121 relay-transmits a relay transmission packet 709 to the host controller 101 at a timing S708. The relay transmission packet 709 has the same contents as the packet 706.

FIG. 10 is an explanatory diagram of a control timing in a case where the packet is being transmitted from the previous-stage communication device 121 to the host controller 101 when the subsequent-stage communication device 141 transmits the packet to the previous-stage communication device 121.

A serial signal line 801 connects the previous-stage communication device 121 to the host controller 101 in the same manner as the serial signal line 701. A serial signal line 802 connects the subsequent-stage communication device 141 to the previous-stage communication device 121 in the same manner as the serial signal line 702.

At a timing S803, a packet 804 is transmitted from the previous-stage communication device 121 to the host controller 101. At a timing S805 before the transmission of the packet 804 is finished, a packet 806 is transmitted from the subsequent-stage communication device 141 to the previous-stage communication device 121.

The previous-stage communication device 121 that has received the packet 806 confirms that the transmission destination ID 201 of the packet 806 is "00h" indicating the packet addressed to the host controller 101 in accordance with Step S503 of FIG. 7. The transmission destination ID 201 is included in data 807 stored in an offset address +0 of the packet 806. After confirming that the transmission destination ID 201 is "00h", the communication device 121 temporarily accumulates the packet 806 in the buffer 124 at a timing S808 because the packet 804 is being transmitted. At a timing S809 after the transmission of the packet 804 is finished, the communication device 121 sequentially transmits the packet 806 accumulated in the buffer 124 as a relay transmission packet 810. The relay transmission packet 810 has the same contents as the packet 806.

As described above, if the communication device 121 happens to perform communications simultaneously with the communication device 141, the communication device 121 temporarily accumulates the packet received from the communication device 141 in the buffer 124, and transmits the temporarily-accumulated packet after the transmission from the communication device 121 is finished. Therefore, communication timings can be shifted to allow stable communications without causing a collision between the packets, which can realize a communication method that simultaneously satisfies responsiveness of the communications for both the packets.

Note that, the host controller 101 may not be used for the configuration. In other words, at least three communication devices are connected in series to the serial communication channel, and communication devices that are not directly connected to each other are handled in a transparent manner. The relay-transmitting communication device provided between the two communication devices includes the buffer for temporarily accumulating data received from one of the two communication devices. If the relay-transmitting communication device receives data addressed to the other communication device from the one of the two communication devices while transmitting data whose transmission source is the relay-transmitting communication device itself to the other communication device, the relay-transmitting communication device temporarily accumulates the received data in the buffer. In this manner, data pieces to be transmitted are prevented from colliding with each other.

The communication device according to the above-mentioned embodiments of the present invention can be applied to a system including a plurality of serial communication ICs, application specific integrated circuits (ASICs), or microprocessors. This system can be used in a communication system employing a connection configuration in which the communication device at the previous stage is further connected to the communication device at the subsequent stage and performs relay-transmission so that the host controller handles the communication device at the subsequent stage in a transparent manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-037261, filed Feb. 23, 2012, which is hereby incorporated by reference herein in its entirety.

What is claimed is:

1. An electronic device, comprising:
    a first interface configured to communicate with a first communication device located on an upstream side of a communication path;
    a second interface configured to communicate with a second communication device located on a downstream side of the communication path;
    a buffer configured to buffer the data which is received from the second communication device via the second interface;
    a generating unit configured to generate data to be transmitted to the first communication device;
    a determination unit configured to determine whether or not transmission to the first communication device is being performed via the first interface when reception from the second communication device is performed via the second interface; and
    a control unit configured to
    when the determination unit determines that the transmission to the first communication device is being performed via the first interface, buffer data received from the second communication device in the buffer, and transmit the received data buffered in the buffer to the first communication device after the transmission to the first communication device is finished, and
    when the determination unit determines that the transmission to the first communication device is not being performed via the first interface, transmit the data received from the second communication device to the first communication device without buffering the received data received in the buffer.

2. An electronic device according to claim 1, wherein:
    the data received from the second communication device comprises identification information on a transmission destination; and
    the control unit discards the received data in a case where the identification information is not the first communication device.

3. An electronic device according to claim 2, wherein, in a case where the data received from the second communication device is buffered in the buffer, the control unit enables the data generated by the generating unit and the data buffered in the buffer to be transmitted alternately to the first communication device.

4. An electronic device according to claim 1, further comprising a timer configured to output a transmission request at predetermined time intervals,
    wherein the control unit enables the data generated by the generating unit to be transmitted to the first communication device in response to the transmission request output from the timer.

5. An electronic device according to claim 1, wherein:
    the first interface performs serial communications with the first communication device; and
    the second interface performs serial communications with the second communication device.

6. A communication control method to be executed by an electronic device comprising a first interface configured to communicate with a first communication device located on an upstream side of a communication path, a second interface configured to communicate with a second communication device located on a downstream side of the communication path, and a buffer configured to buffer data,
    the communication control method comprising:
    generating data to be transmitted to the first communication device;
    determining whether or not transmission to the first communication device is being performed via the first interface when reception from the second communication device is performed via the second interface;
    buffering, when it is determined that the transmission to the first communication device is being performed via the first interface, the data received from the second communication device in the buffer, and transmitting the received data buffered in the buffer to the first communication device after the transmission is finished; and
    transmitting, when it is determined that the transmission to the first communication device is not being performed via the first interface, the data received from the second communication device to the first communication device without buffering the received data in the buffer.

7. A communication control method according to claim 6, wherein:
    the data received from the second communication device comprises identification information on a transmission destination; further comprising:
    discarding the received data in a case where the identification information is not the first communication device.

8. A communication control method according to claim 7, wherein:
    in a case where the data received from the second communication device is buffered in the buffer, the generated data and the data buffered in the buffer are allowed to be transmitted alternately to the first communication device.

9. A communication control method according to claim 6, further comprising:
    transmitting the generated data to the first communication device in response to a transmission request output from a timer that is output the transmission request at predetermined time intervals.

10. A communication control method according to claim 6, wherein:
    the first interface performs serial communications with the first communication device; and
    the second interface performs serial communications with the second communication device.

11. A computer program product stored on a non-transitory computer-readable storage medium for causing a computer to execute each step in the method according to claim 6.

* * * * *